JOE E. CAFARO
INVENTOR

JOE E. CAFARO
INVENTOR

Huebner & Worrel
ATTORNEYS

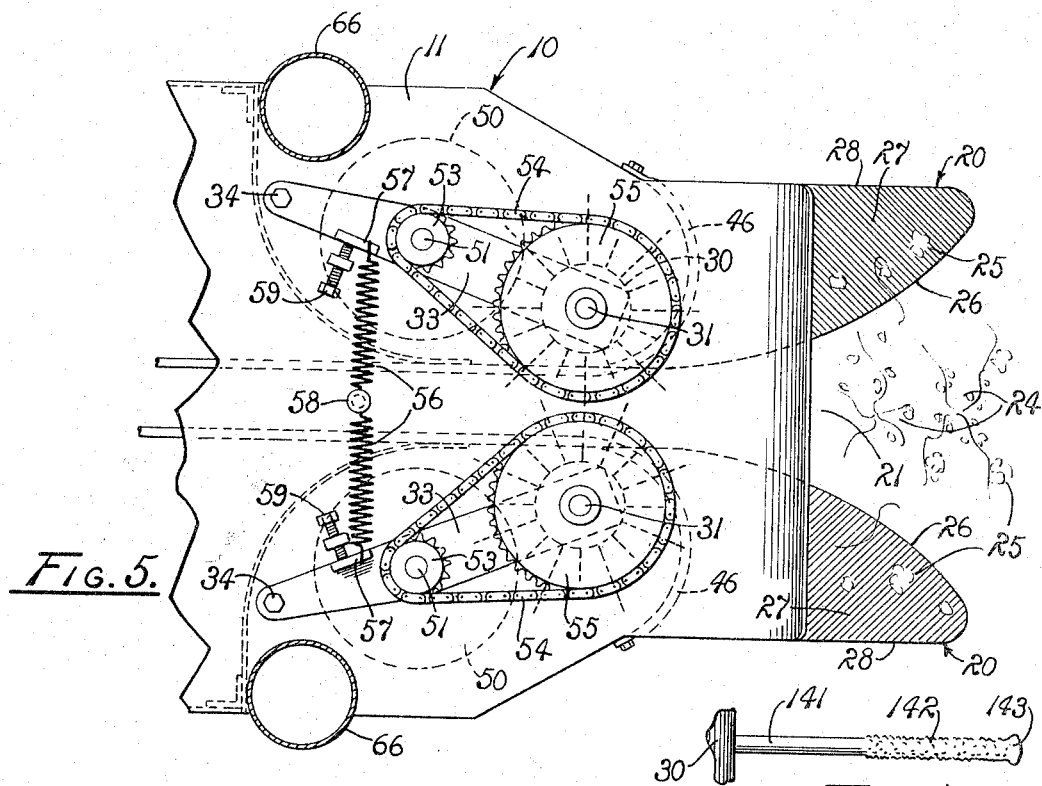
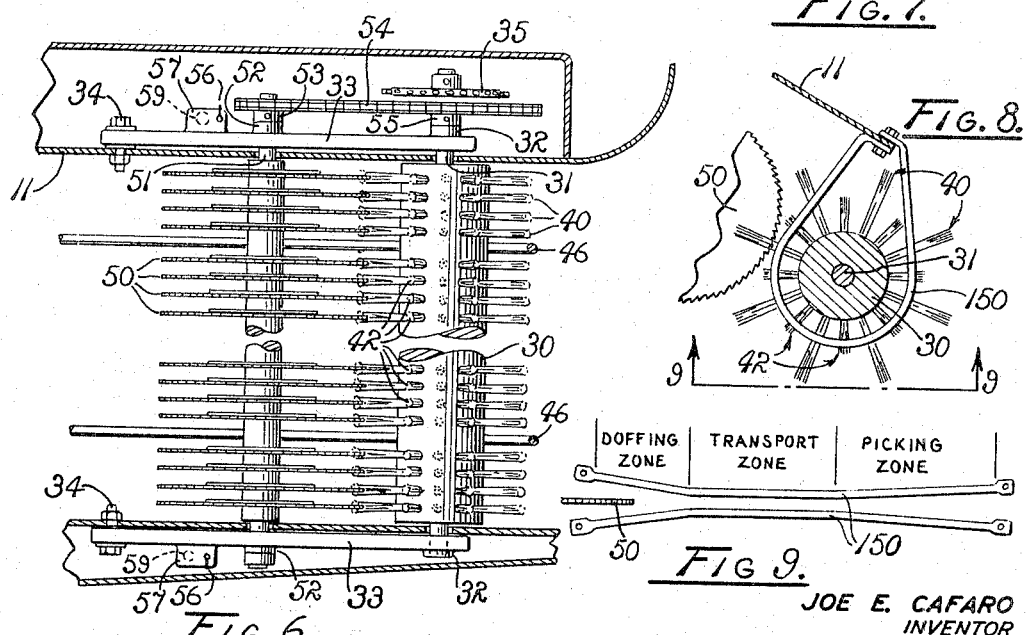

United States Patent Office 3,312,047
Patented Apr. 4, 1967

3,312,047
COTTON HARVESTING MACHINE
Joe E. Cafaro, 1555 S. Minnewawa,
Fresno, Calif. 93702
Filed Dec. 6, 1963, Ser. No. 328,621
13 Claims. (Cl. 56—48)

The present invention relates to an improved cotton harvesting machine which incorporates novel means to remove the cotton fibers from growing plants and includes cooperating means to guide the plants and individual bolls into the machine.

As a result of technical advancement made in the field of agriculture, the production per acre of land has frequently exceeded the capacity of contemporary machines efficiently to harvest the mature crop. This is particularly true in the harvesting of cotton grown in the San Joaquin Valley, wherein use of contemporary cotton harvesting machines frequently results in loss of cotton because of the limited capacity of such machines.

Typical contemporary cotton harvesting machines normally provide a plurality of individually rotatable spindles carried respectively on a pair of upright picking drums mounted for individual rotation on opposite sides of a picking zone through which cotton plants move relative to the machine. As soon as an individual spindle engages the fibers of a cotton boll and becomes loaded with such cotton fibers, the spindle is incapable of havesting additional cotton, even though it continues to operate within the picking zone. Since the rotatable drums on which the individual spindles are carried are rotated at a peripheral speed synchronized with the ground traversing speed of the supporting vehicle, other spindles will not operate in this area which has not been harvested due to the already loaded condition of the spindle or spindles moving through it. Accordingly, a need exists for an improved cotton harvesting machine capable of effectively gathering cotton crops reflecting the increased yield due to technological advancement.

In addition, such spindle-type cotton harvesting machines necessarily require expensive precision components in the power train to drive the several elements thereof, and are subject to rapid wear. Consequently, an owner and operator of such harvesting machines must necessarily incur a large initial capital outlay as well as make frequent expenditures for maintenance and repair. A further shortcoming of conventional spindle-type cotton pickers is their tendency to cause a matting, or roping, of the cotton fibers due to their being tightly wound about the spindles. As a consequence, the quality of the harvested cotton is adversely affected, which results in downgrading at the gins or spinning mills and represents a financial loss to the grower.

Accordingly, it is an object of the present invention to provide an improved cotton harvesting machine.

Another object is to provide a novel means to remove the cotton fibers from the plants which effectively harvests mature cotton while preventing injury to the plants and unripened bolls thereon.

Another object is to provide laterally opposed harvesting means on opposite sides of a picking zone through which cotton plants are moved and permits free access to the mature cotton by the harvesting means on each side of the row.

A further object is to provide an improved havesting machine capable of recovering bolls growing near the ground, while preventing the entry of foreign material, such as stones, clods of earth, and the like.

These, together with other objects, will become more fully apparent upon reference to the following description and accompanying drawings.

In the drawings:

FIG. 5 is an enlarged fragmentary view in horizontal longitudinal section taken on line 5—5 of FIG. 2.

FIG. 6 is an enlarged fragmentary vertical section taken in a plane represented by the line 6—6 of FIG. 1.

FIG. 7 is an enlarged view in side elevation of a second form of bristle adapted for use in the present invention.

FIG. 8 is a fragmentary view in horizontal longitudinal section similar to FIG. 4, but showing one of the harvesting cylinders provided with a bristle control means.

FIG. 9 is a fragmentary view in longitudinal vertical section taken from a position indicated by the line 9—9 in FIG. 8.

Figure 1:
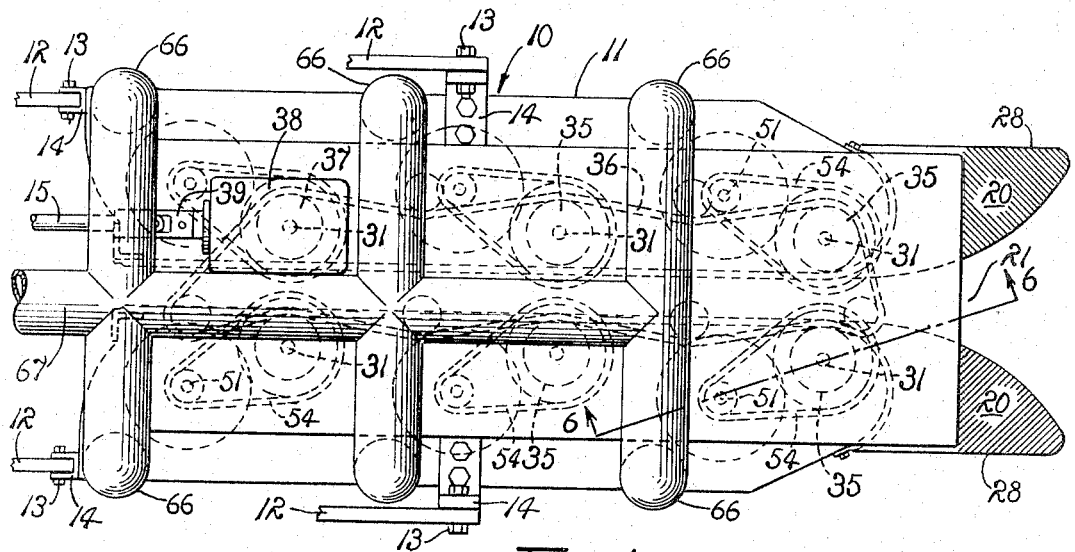
FIG. 1 is a fragmentary top plan view of a cotton harvesting machine embodying the principles of the present invention.
Figure 2:
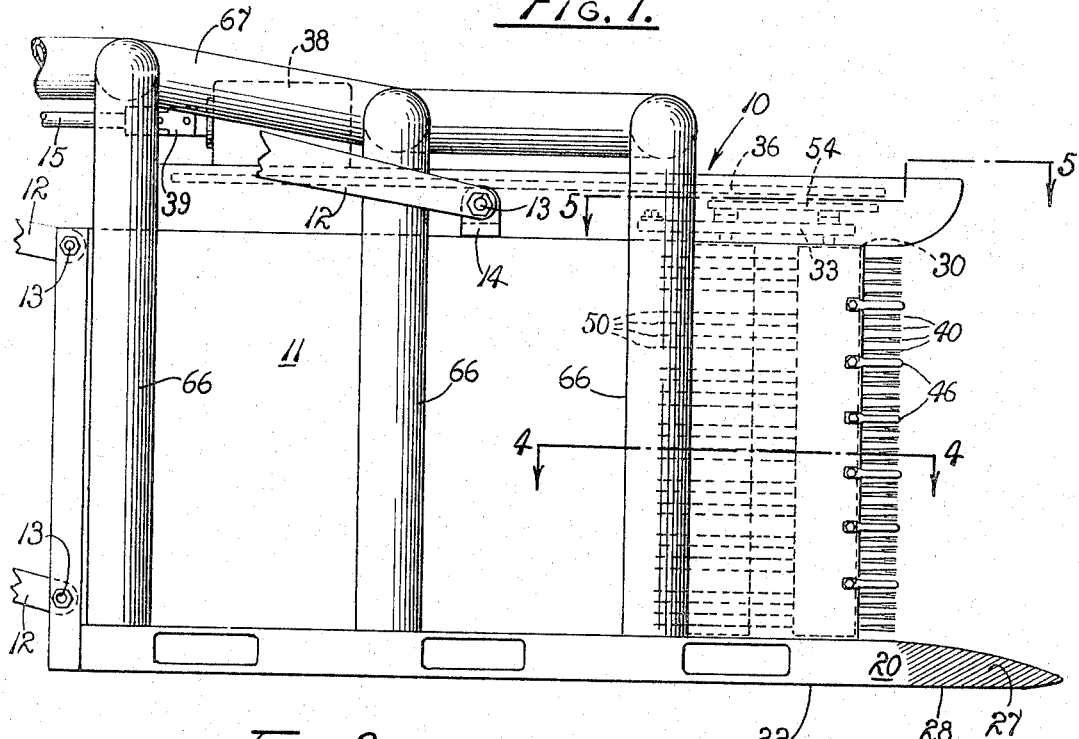
FIG. 2 is a fragmentary view in side elevation of the machine of FIG. 1.

Referring in greater particularity to FIGS. 1 and 2, a picking unit is illustrated at 10 and includes a sheet metal housing 11 adapted to be detachably connected to a self-propelled vehicle, not shown, by means of a plurality of links 12. The links are pivotally connected to the housing 11 as by bolts 13 received in suitably apertured lugs 14. This permits selective elevational movement of the picking unit 10 with respect to the surface of the ground over which the vehicle is traveling and in which elongated rows of cotton are growing. A power take-off shaft is fragmentarily illustrated at 15 and extends from the vehicle in driven relationship to the prime mover thereof, also not shown. During motivation of the vehicle, the shaft 15 is operated continuously to provide driving energy to the power train of the picking unit 10 which will be subsequently described.

A pair of laterally opposed ground engaging shoes 20 are rigidly carried by the housing 11 and extend forwardly thereof. The functions of the shoes 20 include elevational control of the housing 11 relative to the earth surface, guiding of the plants through a plant passageway 21 defined by the shoes and the housing, and lifting lower branches and bolls growing thereon so as to present such bolls to the harvesting means carried in the housing.

Figure 3:
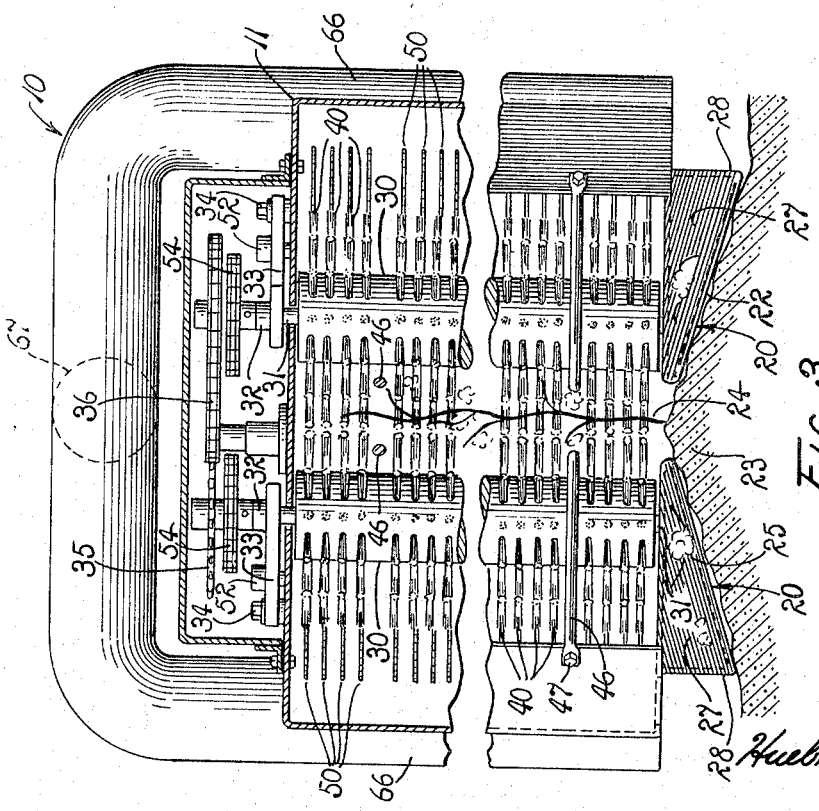
FIG. 3 is an enlarged fragmentary view in front elevation of the machine of FIG. 1 with portions thereof shown in vertical transverse section for illustrative convenience.

As can be seen more clearly in FIG. 3, each of the shoes 20 provides a lower downwardly presented surface 22 adapted to engage a respective side of a crested seedbed 23 in which cotton plants 24 are growing. As illustrated in the drawings, the lower surface 22 is inclined relative to the horizontal plane at approximately 19° so as to permit substantial conformance with the sloped sides of the crested seedbed 23.

Individual bolls 25 grow on the plants 24 at varying elevations, some being near as well as on the surface of the ground. Relative movement occurs between the plants and picking unit 10 during plant movement through the passageway 21, generally defined by inwardly rearwardly converging edges 26 of the shoes 20. Each of the shoes also provides an upwardly presented boll guiding surface which is longitudinally rearwardly upwardly inclined, as well as being outwardly downwardly inclined. Accordingly, relative movement between the shoes 20 and the bolls 25 growing on lower branches of the cotton plants 24 will effect elevation of such lower branches and bolls, while permitting gravitational movement of loose foreign objects outwardly from the plant passageway 21. Examples of foreign objects encountered during cotton harvesting are small stones, hardened clods of earth, broken portions of cotton plants, and other objects which are more dense than cotton fibers and which may readily gravitationally move down the outwardly and downwardly inclined upper surface of the shoes 20.

A plurality of pairs of laterally opposed picking cylinders 30 are rotatably mounted in the housing, the cylinders of each pair being disposed on opposite sides of the plant passageway 21 extending through the housing. Each of the cylinders 30 is mounted for rotation about a substantially upright axis by means of a shaft 31 rotatably mounted in upper and lower bearings 32 carried in elevationally spaced arms 33. One end of each of the arms is pivotally mounted in the housing 11 by means of a pivot pin 34. This mounting permits movement of the picking cylinders 30 of each pair toward and away from each other to accommodate any variation in the density of cotton plant growth as well as the lateral extent thereof.

To effect powered rotation of each of the cylinders 30, a drive sprocket 35 is secured to the upper end of each of the shafts 31. An elongated continuous chain 36 is trained about the respective sprockets 35 of the shafts 31 and driven by an output sprocket 37 of a transfer drive 38. The transfer drive is connected in driven relationship to the power take-off shaft 15 by means of a conventional universal joint 39.

Each of the picking cylinders 30 is provided with a plurality of tufts 40 containing individual bristles 41 of a first predetermined length. Each cylinder 30 also carries a plurality of tufts 42 formed by bristles 43 of a second predetermined length, shorter than the bristles 41. All of the bristles are fabricated of a material such as nylon or natural fibers so as to provide limited longitudinal flexibility and resilience, yet being of sufficient rigidity and stiffness to impale cotton fibers of the individual bolls 25. All of the tufts are arranged in axially spaced individual layers, and the tufts 40 and 42 of each layer are disposed in circumferentially alternately spaced arrangement. Accordingly, during rotation of each of the cylindrical picking members 30, the distal ends of the tufts 40 and 42 describe respective circular paths of travel 44 and 45.

Figure 4:
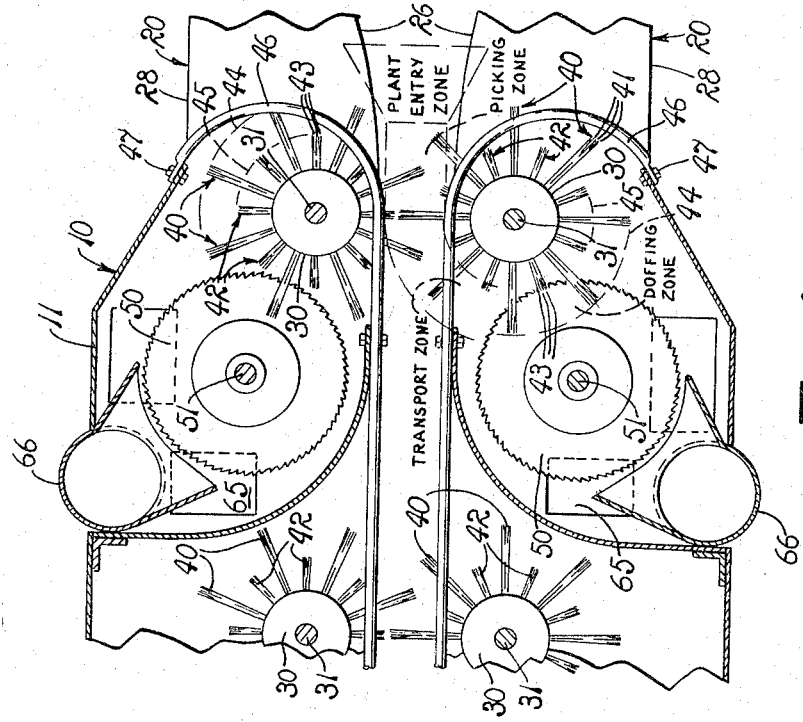
FIG. 4 is an enlarged fragmentary view in horizontal longitudinal section taken on line 4—4 of FIG. 2.

By reference to FIGS. 4 and 5, it will be noted that the individual picking cylinders 30 of each pair are oriented so that the longer tufts 40 of one of the cylinders are disposed immediately adjacent to the shorter tufts 42 of the other cylinder and thereby facilitate penetration of the cotton fibers by the individual bristles 41 and 43. It will also be noted that the tufts 40 and 42 of each of the laterally opposed picking cylinders are simultaneously afforded free access to the individual bolls of cotton plants entering the housing 11 along the plant passageway 21, particularly, in that portion of the passageway delineated in FIG. 4 and identified as the "picking zone." To insure that the cotton plants 24 are constrained to the passageway 21, a plurality of vertically spaced grid bars 46 are secured to the housing 11 by individual bolts 47 on opposite sides of the passageway 21.

Doffing mechanism is provided in the housing 11 in the form of a plurality of individual vertically spaced doffing saws 50, each being associated with a respective one of the individual layers of tufts of each cylinder 30. Each group of saws is supported on a respective shaft 51 rotatably mounted from bearings 52 carried in the arms 33. A driven sprocket 53 is secured to each shaft 51 and a chain 54 trained thereabout connects the shaft 51 in driven relationship to a sprocket 55 secured to the respective shaft 31 of each of the cylinders 30.

As can be seen in FIG. 5, the laterally opposed picking cylinders 30 of each pair are biased toward each other by means of respective springs 56. Each spring is mounted with one end secured to a lug 57 carried by each of the arms 33 and with an opposite end connected to an anchorage 58 provided in the housing 11. An adjustable stop 59 is also provided in the housing to limit inward movement of each of the arms 33 and consequently determines the minimum clearance between the respective distal ends of the tufts 40 and 42 carried on the respective picking cylinders 30 of each pair.

A doffing chamber 65 is provided in the housing 11 for each of the respective picking cyilnders 30 and for its associated doffing saws 50. Each of the doffing chambers 65 is in communication with respective individual branch conduits 66 leading to a transport conduit 67. The transport conduit is connected to a blower, not shown, so as to convey the cotton removed from the picking cylinders to a carrier basket, also not shown but normally provided in cotton harvesting machines.

*Operation*

The operation of the described embodiment of the subject invention is believed to be readily apparent and is briefly summarized at this point. The self-propelled vehicle on which the picking unit 10 is mounted is oriented with respect to a row of cotton plants 24 so as to be able to traverse a predetermined path of travel substantially coincident with the row of plants. Consequently, relative movement between the plants and the housing 11 will effect movement of the individual plants along the plant passageway 21 defined by the housing in conjunction with the laterally opposed shoes 20 and the picking cylinders 30.

During earth traversing movement of the vehicle, the power take-off shaft 15 is operated continuously so as to provide a motive power for rotation of the picking cylinders 30 in opposite, but complementary directions. During such rotation, the distal ends of the respective tufts 40 and 42 of each cylinder are moved in respective substantially horizontal circuitous paths. As can be seen in FIG. 4, the opposite complementary direction successively carries each of the tufts through a picking zone, a transport zone, and a doffing zone, identified by appropriate legends. It will also be seen that a plant entry portion precedes the picking zone, the entry portion being defined by the respective paths of travel of the tufts of laterally opposed cylinders and is directed rearwardly inwardly toward the plant passageway 21. Accordingly, the tufts of each cylinder are afforded simultaneous free access to the individual bolls of cotton plants entering the housing 11 along the plant passageway 21, particularly, in that portion of the passageway delineated in FIG. 4 and identified as the "picking zone."

Prior to the present invention, conventional cotton harvesting machines employed spring-biased plates termed "pressure plates" to urge the cotton plants into engagement with the picking elements. Consequently, for a given longitudinal extent of the picking unit 10, twice as many picking elements can be accommodated by the present invention, since pressure plates are eliminated and the number of picking elements doubled. Also, by disposing the picking cylinder 30 in laterally opposed relation with their upright axes lying in a substantially vertical plane normal to the plant passageway 21, and by controlling the speed of rotation to effect synchronization between the peripheral speed of the longer tufts 40 with the rate of ground traversing movement of the picking unit 11, maximum cotton fiber recovery is assured while minimizing damage to the individual cotton plants.

The arrangement of the longer and shorter tufts 40 and 42 on the respective cylinders 30 of each laterally opposed pair and orienting each of such individual cylinders so that the distal ends of the longer tufts 40 of one cylinder are adjacent to the distal ends of the shorter tufts 42 of the opposite cylinder, effects a cooperative movement between the longer and shorter tufts which insures impaling of the individual cotton bolls by the bristles 41 and 43. Also, such interaction effects a spreading of the bristles of each of the individual tufts, and due to the resiliency of such bristles, the cotton fibers are dependably retained as the tufts move from the picking zone to the transport zone. Consequently, moving through the transport zone, the cotton fibers are held in slight compression between the bristles of each individual tuft due to their longitudinal resiliency.

Further movement of the individual tufts through their respective circuitous paths carries the tufts and the cotton fibers held thereby through the doffing zone. Since the doffing saws are running in an opposite direction and at a higher peripheral speed than the tufts 40 and 42, the saws are effective to remove fibers of cotton held in the tufts as well as impaled on the individual bristles 41 and 43 thereof. Subsequently, the cotton fibers are recovered from the doffing chamber 65 through the branch conduit 66 and transport conduit 67 by the blower of the pneumatic conveying system.

FIG. 7 illustrates a specialized form of bristle 141 particularly adapted for use in either of the tufts 40 or 42 of the present invention. The bristle 141 is provided with a surface configuration to enhance picking of the cotton fibers from the bolls 25 and retaining such fibers for movement through the transport zone to the doffing zone. As a specific example of a suitable surface configuration, the bristle 141 is provided with a plurality of individual knurls, or ridges, 142 at least on that portion of the surface adjacent the distal end of each bristle. In addition, a radially extended barb 143 is carried at the distal end to enhance retention of any cotton fibers impaled by the bristle 141 while in the picking zone and insure removal of the cotton fibers from the plant 24.

FIGS. 8 and 9 illustrate additional means to insure grasping of the cotton fibers of the individual bolls by the bristles of each tuft. A pair of vertically spaced bristle control rods 150 are mounted in the housing 11 and associated with a respective one of the vertically spaced layers of tufts carried on each of the picking cylinders 30. The rods 150 of each pair are mounted in rearwardly converging relation in the picking zone of the tufts of its respective layer so as to compress the bristles of each tuft diametrically inwardly toward each other and effect a grasping of the cotton fibers of any boll within the range of movement of the bristles and within the respective circuitous path of a given tuft.

The rods 150 rearwardly converge to a minimum vertical dimension at the entry of the transport zone and are disposed in substantially parallel relation throughout the transport zone. Consequently, the rods maintain the bristles of each tuft in a compressed condition to retain cotton therebetween.

To permit a release of any cotton fibers held by the bristles of a given tuft, the rods 150 are disposed in rearwardly diverging relation in the doffing zone, thereby permitting the bristles to move radially outwardly and providing a greater ease of removal by the doffing saws 50. The term "rearwardly" in relation to the convergence and divergence of the rods 150 of each pair is used in relation to the direction of movement of the individual tufts through their respective circuitous paths of travel, including the picking, transport, and doffing zones.

Accordingly, the present invention provides a picking unit with cooperating picking elements affording greater access to the individual bolls of high-yield cotton and eliminates the greater portion of costly precision manufactured gears, bearings, and other machine components required in conventional spindle-type harvesting machines. Also, the cotton fibers do not become tightly wound on individual spindles, which improves the quality of the yield. By the novel arrangement of laterally opposed picking cylinders carrying tufts of two different lengths circumferentially alternately arranged, an interaction between the tufts of adjacent cylinders insures impaling of the cotton bolls and a harvesting efficiency not obtainable with contemporary machines. The ground engaging plant and boll guiding shoes, in combination with the effective picking cylinders, insures harvesting and recovery of substantially all of mature cotton bolls borne by the plants, while preventing inclusion of foreign objects frequently included by conventional machines. In addition, the shoes maintain alignment of the picking unit 10 with a row of plants. Accordingly, the efficiency of harvesting, as well as the quality and cleanliness of the cotton harvested, are greatly improved by the present invention.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a cotton harvesting machine adapted for earth traversing movement along a predetermined path of travel, a picking housing mounted on the machine and adapted to be moved along a row of cotton plants, a plurality of tufts of elongated bristles; means in the housing collectively mounting the tufts in a pair of laterally opposed separate groups and defining therebetween a plant passageway, including means for moving the tufts of each group in a respective substantially horizontal circuitous path, each of said paths having a plant entry portion directed rearwardly inwardly toward said passageway, a picking portion, a cotton transporting portion, and a doffing portion, the entry portions of said paths being in laterally opposed longitudinally aligned relationship to afford simultaneous free access by tufts of both groups in said entry portions to cotton plants entering said passageway, the bristles of each tuft being adapted to engage cotton on such plants and to transport said cotton during movement through said passageway; doffing means rotatably mounted in the housing along the respective doffing portions of said circuitous paths peripherally engageable with the tufts for removing cotton from the bristles; and powered drive means connected to the tuft mounting means and to the doffing means moving the tufts rearwardly along the passageway at a speed substantially equal to the earth traversing speed of the machine and rotating the doffing means in the same direction in the housing as the circuitous movement of their respective tufts whereby said tufts and doffing means have opposite relative peripheral directions of movement when in engagement.

2. The cotton harvesting machine of claim 1 wherein each of said bristles is provided with a barb at the respective distal end thereof to retain cotton impaled by the bristles while moving through the picking portions of their respective paths.

3. The cotton harvesting machine of claim 1 wherein each of the bristles is individually kurled to provide a surface configuration adapted to engage the cotton and wherein each of said bristles is provided with a bar at the distal end thereof to retain cotton impaled by the bristles.

4. In a cotton harvesting machine adapted for earth traversing movement, a picking housing mounted on the machine and adapted to be moved along a row of cotton plants, a pair of laterally opposed substantially cylindrical members mounted in the housing for rotation about substantially upright respective axes, said axes being disposed in substantially parallel relation and defining a plant passageway therebetween, a plurality of tufts of bristles mounted on each of said cylindrical members in respective axially spaced circumferentially extended layers, the tufts of each layer being of respective first and second lengths alternately circumferentially spaced therearound, said laterally opposed cylindrical members being disposed relative to each other so that the tufts of said first length of one of said members are disposed immediately adjacent the tufts of said second length of the other of said cylindrical members during rotation thereof, and power means to effect synchronized rotation of said cylindrical members at a speed proportionate to the rate of movement of said harvesting machine along said row whereby cotton growing on said plants is impaled by the interaction of the respective tufts of the laterally opposed cylindrical members.

5. The harvesting machine of claim 4 wherein the paths of each layer of tufts include a picking zone, a transport zone, and a doffing zone and wherein tuft control means are mounted in the housing compressing the respective bristles of each tuft as they move through said picking zone and constrain said bristles in a compressed condition while moving through said transport zone, and releasing the bristles during movement through said doffing zone.

6. The harvesting machine of claim 5 wherein said bristle control means includes pairs of vertically spaced control rods mounted in the housing and axially spaced along said cylindrical members, each pair of rods defining a passageway for the tufts of each respective layer of tufts, and wherein the rods of each pair are mounted in rearwardly converging relation in said picking zone, in substantially parallel relation in said transport zone, and in rearwardly diverging relation in said doffing zone.

7. In a cotton harvesting machine adapted for earth traversing movement, a picking housing mounted on the machine and adapted to be moved along a row of cotton plants, vertically spaced pairs of laterally opposed support arms pivotally mounted in the housing for limited movement in respective vertically spaced substantially horizontal planes for rotation about substantially upright respective axes, said axes being disposed in substantially parallel relation and in a plane substantially normal to said path of travel and thereby defining a plant passageway therebetween, a plurality of tufts of bristles mounted on each of said cylindrical members in respective axially spaced circumferentially extended layers, the tufts of each layer being of respective first and second lengths alternately circumferentially spaced therearound, said laterally opposed cylindrical members being disposed relative to each other so that the tufts of said first length of one of said members are disposed immediately adjacent the tufts of said second length of the other of said cylindrical members during rotation thereof, power means to effect synchronized rotation of said cylindrical members at a speed proportionate to the rate of movement of said harvesting machine along said row whereby individual cotton particles growing on said plants are impaled by the interaction of the respective tufts of the laterally opposed cylindrical members and biasing means carried by the housing and urging said cylindrical members toward each other and inwardly toward said plant passageways.

8. The harvesting machine of claim 7 wherein the paths of each layer of tufts include a picking zone, a transport zone, and a doffing zone and wherein tuft control means are mounted in the housing compressing the respective bristles of each tuft as they move through said picking zone and constrain said bristles in a compressed condition while moving through said transport zone, and releasing the bristles during movement through said doffing zone.

9. The harvesting machine of claim 8 wherein said bristle control means includes pairs of vertically spaced control rods mounted in the housing and axially spaced along said cylindrical members, each pair of rods defining a passageway for the tufts of each respective layer of tufts, and wherein the rods of each pair are mounted in rearwardly converging relation in said picking zone, in substantially parallel relation in said transport zone, and in rearwardly diverging relation in said doffing zone.

10. In a harvester, the combination of a pair of drums mounted for rotation about substantially upright axes in predetermined spaced relation, tufts of bristles radially extended from the drums, and drive means coupled to the drums rotating the drums in opposite directions at substantially the same peripheral speed, alternate tufts circumferentially of each drum being longer than tufts intermediate thereof, the drive means synchronizing the drums so that during rotation the longer and shorter tufts of one drum are successively aligned with the shorter and longer tufts respectively of the opposite drum substantially diametrically of the drums, and the drums being spaced so that the longer tufts overlap during rotation to define a reciprocating path therebetween.

11. In a harvester, a picking element for fibrous material such as cotton comprising a rotatable drum of predetermined radius, and a plurality of discrete tufts of elongated bristles mounted on the drum and outwardly extended therefrom, the bristles being resiliently flexible, the tufts being spaced to accommodate the flexing of the bristles and the entrance of fibrous material between the tufts, the bristles being of a length at least as long as the radius of the drum and as long as the spacing of the tufts to facilitate flexing of the bristles into the spaces between the tufts and the bristles being kurled to retain fibrous material impaled thereon.

12. In a harvester, the combination of a pair of drums mounted for rotation about substantially parallel upwardly extended axes in predetermined spaced relation and defining a plant passage therebetween, alternate elongated relatively longer and shorter resiliently flexible picking means radially extended from the drums in corresponding spaced relation thereabout in corresponding axially spaced planes, and drive means coupled to the drums rotating the drums in opposite directions at substantially the same speed and synchronizing the drums so that as the picking means pass between the drums they are substantially aligned diametrically of the drums.

13. The combination of claim 12 in which the longer picking means are tufts of bristles.

References Cited by the Examiner

UNITED STATES PATENTS

| | | | |
|---|---|---|---|
| 183,433 | 10/1876 | Stoddard et al. | 56—48 |
| 647,655 | 4/1900 | Floyd | 56—48 |
| 685,440 | 10/1901 | Campbell | 56—43 |
| 813,170 | 2/1906 | Piper | 56—44 |
| 1,229,121 | 6/1917 | Murphy | 56—32 |
| 1,826,101 | 10/1931 | Stukenborg | 56—32 |
| 2,674,075 | 4/1954 | Snow | 56—11 |
| 3,039,258 | 6/1962 | Cafaro | 56—49 |

ABRAHAM G. STONE, *Primary Examiner.*
RUSSELL R. KINSEY, *Examiner.*